(12) United States Patent
Philippe et al.

(10) Patent No.: US 8,584,356 B2
(45) Date of Patent: Nov. 19, 2013

(54) METHOD OF MANUFACTURING A CMC FLOW MIXER LOBED STRUCTURE FOR A GAS TURBINE AEROENGINE

(75) Inventors: Eric Philippe, Merignac (FR); Jean-Daniel Lalanne, Saint Medard en Jalles (FR); Pascal Ducharlet, Saint Medard en Jalles (FR); Dominique Coupe, Le Haillan (FR)

(73) Assignee: Snecma Propulsion Solide, Le Haillan Cedex (FR)

( * ) Notice: Subject to any disclaimer, the term of this patent is extended or adjusted under 35 U.S.C. 154(b) by 1070 days.

(21) Appl. No.: 12/526,699

(22) PCT Filed: Feb. 11, 2008

(86) PCT No.: PCT/FR2008/050207
§ 371 (c)(1),
(2), (4) Date: Sep. 17, 2009

(87) PCT Pub. No.: WO2008/104692
PCT Pub. Date: Sep. 4, 2008

(65) Prior Publication Data
US 2010/0005780 A1 Jan. 14, 2010

(30) Foreign Application Priority Data
Feb. 12, 2007 (FR) ...................... 07 53201

(51) Int. Cl.
*B21K 25/00* (2006.01)
*F02K 1/38* (2006.01)
*F02K 1/48* (2006.01)

(52) U.S. Cl.
USPC ........... 29/889.21; 29/889.2; 60/262; 60/270; 181/220; 239/265.19; 415/200

(58) Field of Classification Search
USPC .............. 29/888, 889, 889.2, 889.21; 60/262, 60/264, 770; 239/265.17, 265.19; 181/220, 213; 415/200
See application file for complete search history.

(56) References Cited

U.S. PATENT DOCUMENTS

| | | | | |
|---|---|---|---|---|
| 4,813,230 A | * | 3/1989 | Braithwaite | 60/262 |
| 4,907,743 A | * | 3/1990 | Bouiller et al. | 239/265.11 |
| 6,606,854 B1 | * | 8/2003 | Siefker et al. | 60/262 |

(Continued)

FOREIGN PATENT DOCUMENTS

WO WO 2006/035186 4/2006

*Primary Examiner* — Sarang Afzali
(74) *Attorney, Agent, or Firm* — Preti Flaherty Beliveau & Pachios LLP

(57) ABSTRACT

A method of fabricating a lobed structure for a gas turbine flow mixer having an annular upstream portion extended downstream by a portion forming a multilobed skirt, the method comprising:
  making a fiber preform (100) out of refractory fibers and having a shape corresponding to the shape of the lobed structure to be fabricated, from a plurality of component elements of fiber texture that are assembled together and shaped by means of tooling of a shape corresponding to the shape of the lobed structure to be fabricated so as to obtain an assembled fiber preform having a first preform portion (111) corresponding to the annular portion of the lobed structure and a second preform portion (112) corresponding to the multilobed skirt of the lobed structure, the component elements of the fiber preform being assembled together at least in part along connection lines (121) extending substantially in the flow direction of the flow past the lobes of the multilobed skirt preform portion; and
  densifying the assembled and shaped fiber preform by means of a matrix that is ceramic, at least in part.

34 Claims, 9 Drawing Sheets

(56) References Cited

U.S. PATENT DOCUMENTS

| | | | |
|---|---|---|---|
| 6,610,385 B2 * | 8/2003 | Cairo | 428/172 |
| 6,773,215 B2 * | 8/2004 | Cuva et al. | 411/553 |
| 7,677,026 B2 * | 3/2010 | Conete et al. | 60/262 |
| 2007/0175535 A1 * | 8/2007 | Kostar et al. | 139/387 R |

* cited by examiner

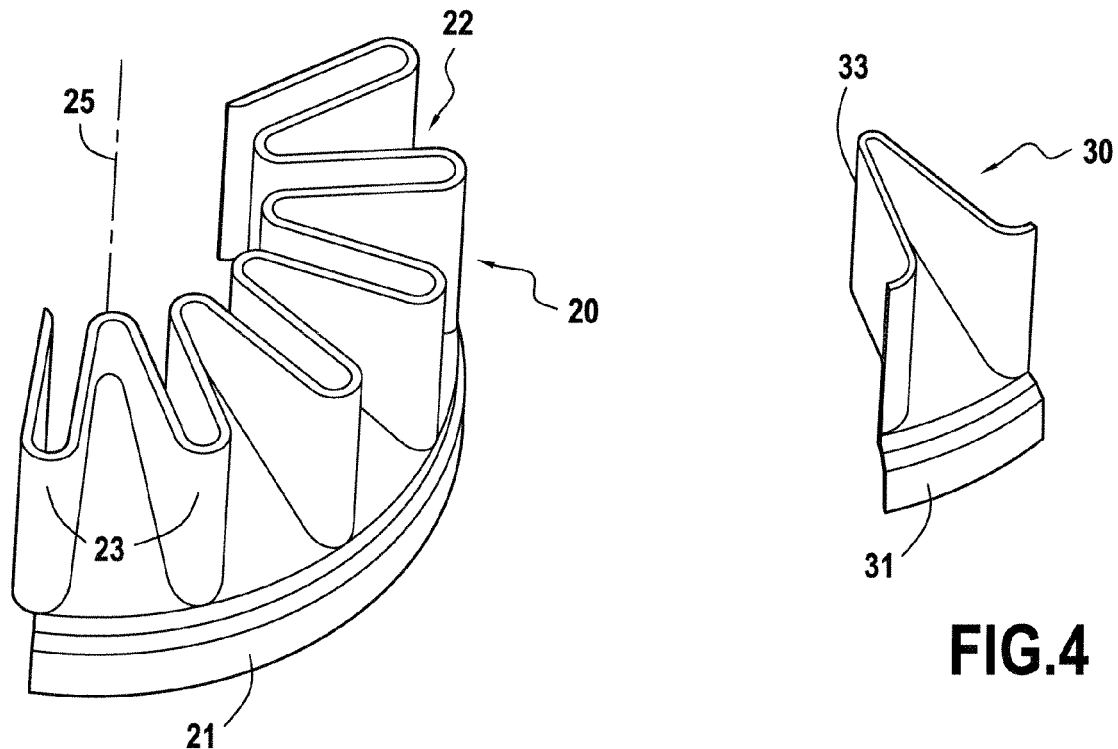
FIG.3
FIG.4
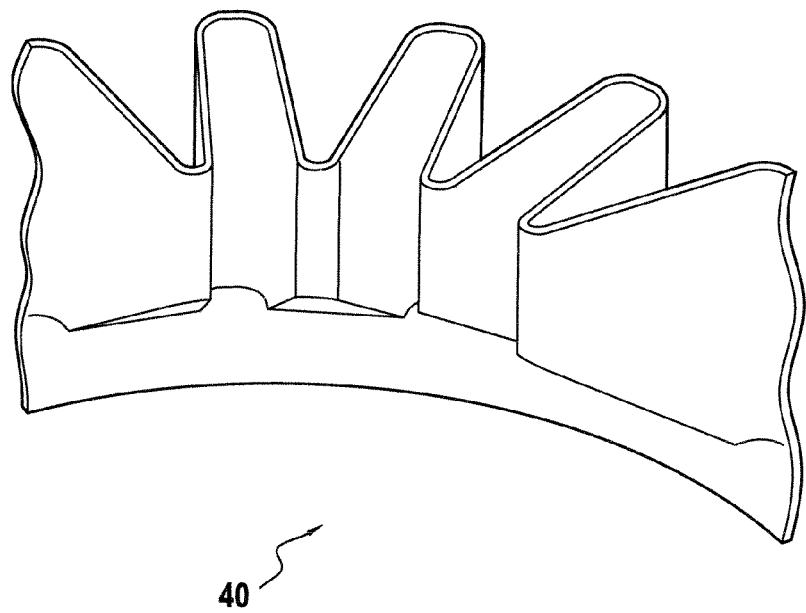
FIG.5

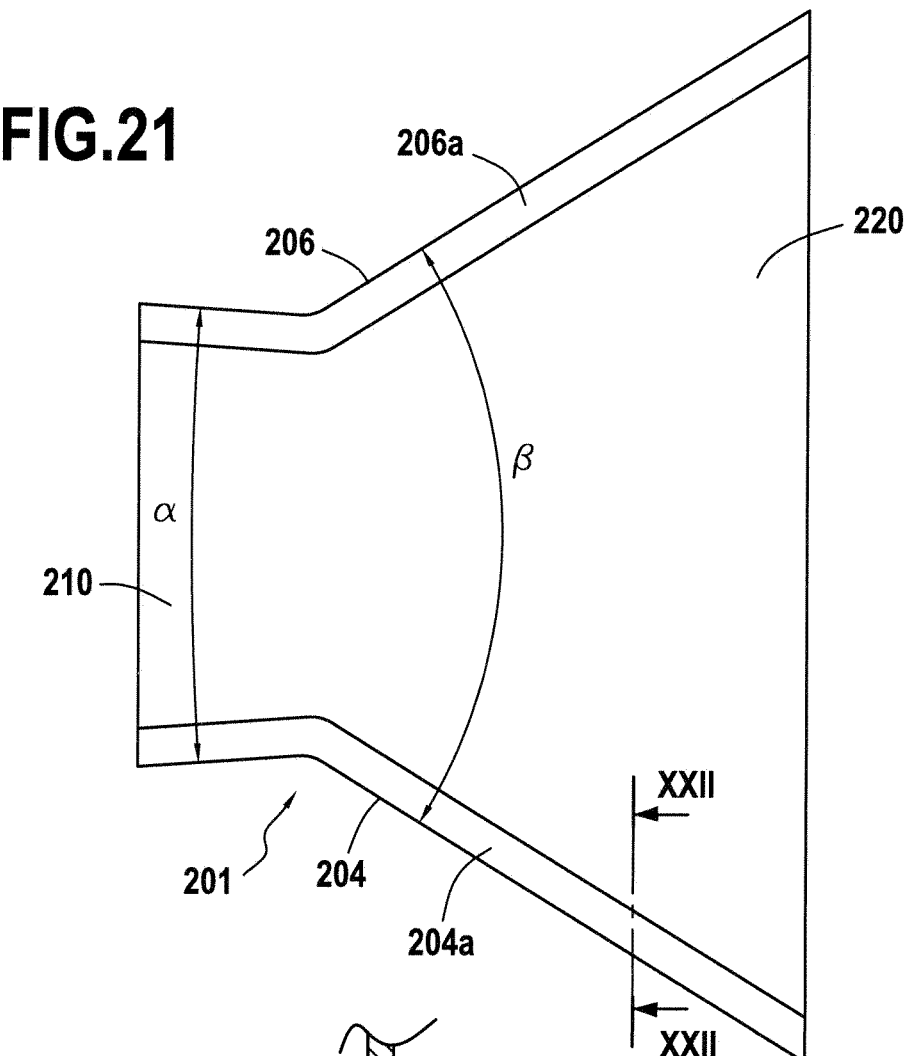

METHOD OF MANUFACTURING A CMC FLOW MIXER LOBED STRUCTURE FOR A GAS TURBINE AEROENGINE

BACKGROUND OF THE INVENTION

The invention relates to making flow mixers out of ceramic matrix composite (CMC) material for bypass gas turbine aeroengines.

In a bypass gas turbine aeroengine, the incoming air flow admitted through the fan is split into a primary flow that passes through the compressor, the combustion chamber, and the turbine, and a secondary flow or fan flow that bypasses the compressor, the combustion chamber, and the turbine. At the outlet, the "hot" primary flow comprising the combustion gases and the "cold" fan flow are mixed together.

In order to reduce the noise of the ejected jet, it is known to use lobed mixers that encourage mixing between the flows.

Proposals have been made to use CMC material for making such lobe mixers in order to minimize their weight while retaining good mechanical behavior. CMC materials are known for their thermostructural properties, i.e. mechanical properties that enable them to act as structural parts, with the ability to retain these properties at high temperatures. Typical CMC materials comprise fiber reinforcement made of refractory fibers (carbon fibers or ceramic fibers) densified by a matrix that is at least in part ceramic.

A CMC lobed mixer is described in document WO 2006/035186. The mixer described in that document is made up of a plurality of lobed structures in the form of sectors that are made separately out of CMC material and then assembled together, and the mixer is also provided with an internal stiffener ring.

OBJECT AND SUMMARY OF THE INVENTION

An object of the invention is to propose a particular method enabling a non-developable CMC lobed structure to be obtained that constitutes a sector of a lobed mixer for the purpose of making a complete mixer by assembling a plurality of sectors together, or even constituting a one-piece CMC lobed mixer, i.e. a mixer that is not obtained by assembling together a plurality of CMC sectors.

This object is achieved by a method of fabricating a lobed structure for a gas turbine flow mixer having an annular upstream portion extended downstream by a portion forming a multilobed skirt having a plurality of lobes distributed around a longitudinal axis of the lobed structure, the method comprising:

making a fiber preform out of refractory fibers and having a shape corresponding to the shape of the lobed structure to be fabricated, from a plurality of component elements of fiber texture that are assembled together and shaped by means of tooling of a shape corresponding to the shape of the lobed structure to be fabricated so as to obtain an assembled fiber preform having a first preform portion corresponding to the annular portion of the lobed structure and a second preform portion corresponding to the multilobed skirt of the lobed structure, the component elements of the fiber preform being assembled together at least in part along connection lines extending substantially in the flow direction of the flow past the lobes of the multilobed skirt preform portion; and densifying the assembled and shaped fiber preform by means of a matrix that is ceramic, at least in part.

The term "annular portion" is used herein to mean a sector of a ring (the longitudinal axis being the axis of the ring) or a complete ring. Similarly, the term "multilobed skirt" is used herein to mean a sector of a complete multilobed skirt or a complete multilobed skirt.

Thus, the fiber preform and the lobed structure obtained by densifying the preform may have a shape that corresponds to a sector of the mixer that is to be made, with the mixer being obtained by assembling together a plurality of lobed structures around the axis of the mixer.

In a variant, the fiber preform may be of a shape that corresponds to the shape of a complete mixer to be made and the mixer is obtained once the preform has been densified, without any need to assemble sectors together.

The invention is remarkable in particular in that aerodynamic head losses are limited by minimizing disturbances to the gas flow through the mixer by assembling the component elements of the preform in the lobes along lines that extend in the flow direction and by making a lobed structure as a single part by densifying an assembled preform, in spite of the preform having a shape that is not developable.

The component elements of the fiber preform can be assembled along the connection lines by stitching or by implanting yarns or needles.

The connection lines preferably extend along the flanks the lobes or along their outer crests.

The component elements of the fiber preform may be assembled together with overlapping adjacent edges thereof, or by means of assembly strips that overlap their adjacent edges.

The component elements may then optionally be made of reduced thickness in the overlap zones of the adjacent edges so as to avoid having significant extra thicknesses present that might disturb the flow of gas.

The fiber texture elements making up the fiber preform may be made by three-dimensional weaving or multilayer weaving, thereby giving them good resistance to delamination.

Advantageously, the fiber texture elements making up the fiber preform are made of ceramic fibers, in particular silicon carbide (SiC) fibers. This ensures that the CMC material obtained after densification with the ceramic matrix has high stiffness, thereby avoiding any need to provide a stiffener ring for the lobes, where the presence of such a ring is penalizing from the aerodynamic point of view.

In one implementation, the method comprises:

making a fiber texture element in the form of a strip;

making incisions through the strips, the incisions extending from one side of the strip, substantially perpendicularly to said side and over a distance that is less than the width of the strip;

cutting out sector-shaped elements from a fiber texture; and assembling each sector with the strip by connecting together the edges of the sector and the edges of a corresponding incision in the strip, each sector thus being inserted between the edges of an incision.

The strip-shaped element may be made by three-dimensional weaving with a thickness in its non-incised portion that is greater than its thickness in its incised portion. It is thus possible to obtain a first preform portion directly that corresponds to the annular portion of the lobed structure and that presents thickness that is greater than the thickness of the second preform portion that corresponds to the multilobed skirt.

In a variant, the first preform portion corresponding to the annular portion of the lobed structure may be obtained by superposing at least one additional annular ply of fiber texture on the strip-shaped element. The additional annular ply may then cover the starter zones of the lobes in the preform portion corresponding to the multilobed skirt at the ends of the incisions in the strip-shaped element, so as to reinforce these starter zones of the lobes.

In another implementation, the method comprises:
making a plurality of fiber texture elements, each comprising at least one sector of a first annular ply constituting the first preform portion corresponding to the annular portion of the lobed structure, and a sector of the second preform portion corresponding to the multilobed skirt of the mixer; and
assembling together the elements at least along the adjacent edges of the sectors of the second preform portion corresponding to the multilobed skirt.

In order to form the first preform portion corresponding to the annular portion of the lobed structure, at least one additional annular ply of fiber texture may be added covering at least the sectors of the first annular ply. An additional and substantially annular ply may then cover the starter zones of the lobes of the second preform portion corresponding to the multilobed skirt so as to reinforce the starter zones of the lobes.

The invention also provides a CMC flow mixer for a gas turbine that is obtained by assembling together a plurality of sectors forming lobed structures fabricated by the above-defined method, or that is formed directly by a lobed structure fabricated by such a method.

The invention also provides a bypass gas turbine aeroengine fitted with such a CMC mixer.

BRIEF DESCRIPTION OF THE DRAWINGS

FIGS. 3 to 5 are diagrammatic perspective views of tooling elements suitable for use in implementing a method in accordance with the invention;

FIG. 21 is a view of a component element of a fiber preform for a lobed structure in a second embodiment of the invention;

FIG. 22 is a fragmentary section view on section plane XXII-XXII of FIG. 21;

DETAILED DESCRIPTION OF EMBODIMENTS

Figure 1:
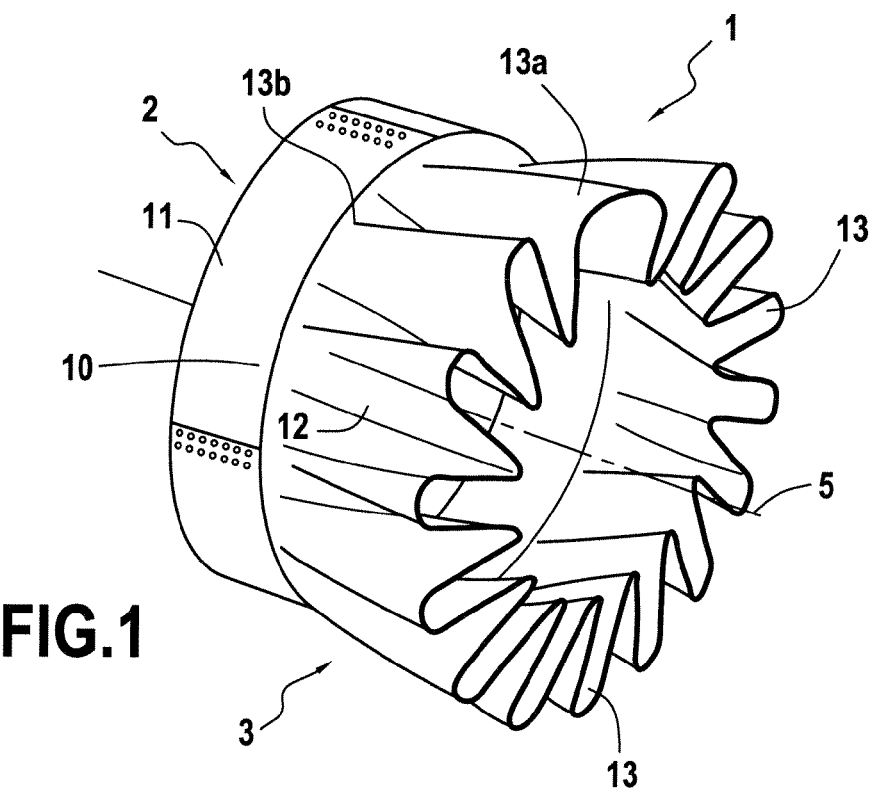
FIG. 1 is a perspective view of a lobed mixer of the kind that can be obtained by a method of the invention.

FIG. 1 shows a lobed flow mixer for a gas turbine aeroengine of the kind that can be obtained by a method of the invention.

The general shape of such a mixer is itself known. The mixer comprises a ring-shaped portion 2 extended downstream by a portion 3 forming a complete multilobed structure or skirt comprising a plurality of lobes 13 distributed circumferentially all around a longitudinal axis 5 of the mixer. The terms "upstream" and "downstream" are used herein relative to the general flow direction of the stream of gas through the mixer. The lobes 13 are of similar shapes, possibly with the exception of one of the lobes 13a that is situated in a zone where the engine is connected to a support mast, which lobe presents an outer crest that is widened and flattened.

In the context of the present invention, the mixer 1 is made of CMC material, which term is used herein to cover materials comprising fiber reinforcement made of refractory fibers (carbon or ceramic) and densified by a matrix that is itself at least partially ceramic, at least an outer phase of the matrix being made of ceramic, it being understood that compounds of the refractory oxide type are included herein under the term "ceramic". Typical examples of such CMC materials are C/SiC materials (reinforcement of carbon fibers and matrix of silicon carbide), SiC/SiC materials (reinforcing fibers and matrix of SiC), and C/C—SiC materials (reinforcement of carbon fibers and matrix both of carbon (close to the fibers) and of SiC). An interphase layer, e.g. of pyrolytic carbon (PyC) or of boron nitride (BN) may be interposed between the fibers and the matrix. In the context of the present invention, it is preferable to use SiC fibers for forming the fiber reinforcement, which SiC fibers may previously be provided with an interphase coating of PyC.

Figure 2:
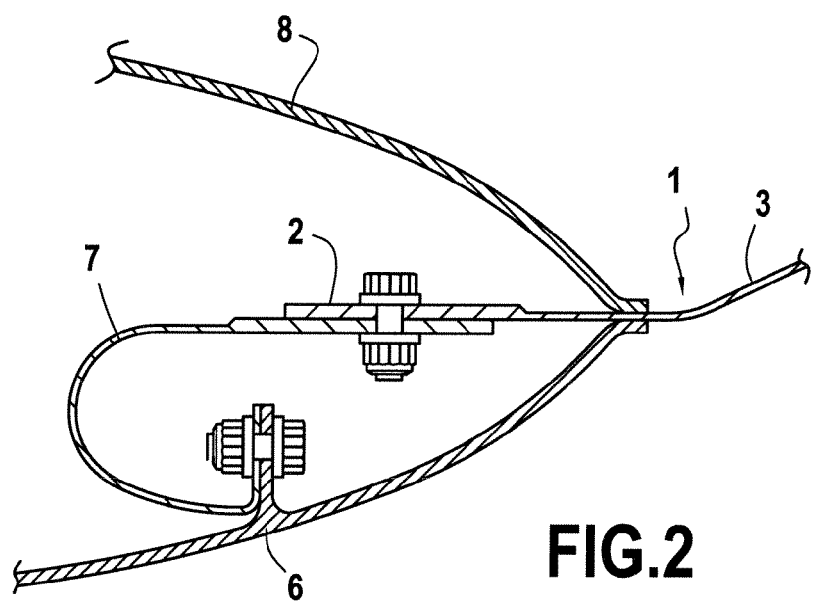
FIG. 2 is a diagrammatic fragmentary section view showing one way of mounting the FIG. 1 mixer.
Figure 6:
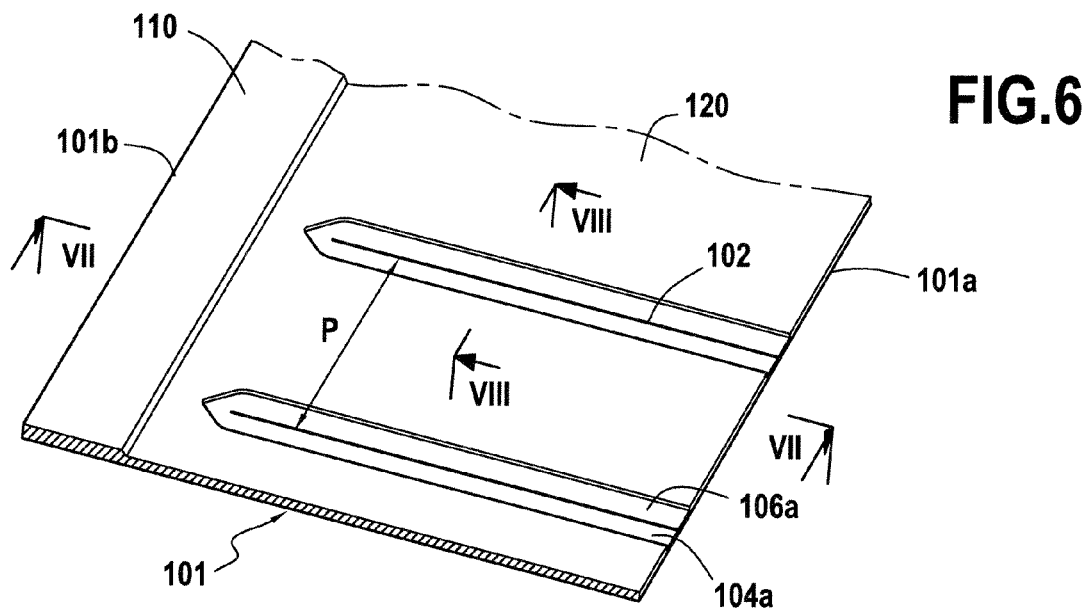
FIG. 6 is a fragmentary view of an element in the form of a strip with incisions forming a component element of a fiber preform for a lobed structure in a first embodiment of the invention.

As shown in FIG. 2, the mixer 1 is supported by a connection with an inner metal shroud 6 by means of metal connection tabs 7. At one end, the connection tabs are fastened to bolts to a flange formed integrally with the inner shroud 6. At their outer ends, the connection tabs 7 are fastened by bolts to the ring 2 of the mixer. The connection tabs 7 are of curved shape so as to present capacity for elastic deformation, thereby serving to accommodate differential expansion of thermal origin between the mixer made of CMC material and the inner shroud 6 made of metal. Other elastically-deformable connection tabs (not shown) alternate with the connection tabs 7 to connect the inner shroud 6 to an outer shroud 8. The shrouds 6 and 8 serve to support the mixer 1 in a casing for an exhaust zone of a gas nozzle. Such an assembly is described in above-mentioned document WO 2006/035186.

In the example shown, the mixer 1 is formed by assembling together a plurality of CMC sectors 10, here three sectors. The sectors may extend over angles that are substantially equal. Each sector 10 forms a lobed structure with an annular portion 11 forming a sector of the ring 2 of the mixer, and a multilobed skirt 12 comprising a plurality of lobes 13 and forming a sector of the multilobed skirt 3 of the mixer. The sectors 10 are assembled together along their adjacent edges, e.g. by bolting or riveting.

According to a characteristic of the method of the invention, the fiber preform constituting the reinforcement of a CMC lobed structure 10 is made from component elements of the fiber texture preform, which elements are assembled together and shaped on a tooling element so as to constitute a complete lobed-structure preform.

Such a tooling element or former 20 having a shape corresponding to the shape of the lobed structure 10 that is to be made can be seen in FIG. 3. It comprises an annular portion 21 corresponding to the annular portion 11 of the lobed structure and a multilobed portion 22 corresponding to the multilobed skirt 12 of the lobed structure, with a plurality of lobes 23 distributed over a fraction of a circumference around an axis 25 and corresponding to the lobes 13 of the lobed structure.

Shaper elements are also provided, enabling the fiber preform to be shaped by making it fit closely against the relief of the former 20 when shaping the preform or while it is being consolidated by partial densification.

Thus, FIG. 4 shows a shaper key 30. It presents a shroud-shaped portion 31 and a projecting portion 33 of shape matching that of a lobe 23 of the tooling 20 so as to be suitable for engaging between the outer crests of two adjacent lobes 23, thereby shaping a fiber texture (not shown) sandwiched between a plurality of keys 30 and the former 20. When the lobed structure that is to be made has lobes of different shapes, then keys of corresponding different shapes are used. In the example shown, a key 30 occupies a sector corresponding to the pitch between lobes 23 in the circumferential direction. Keys covering sectors of greater size could also be used if the shape of the multilobed structure 22 makes that possible.

FIG. 5 shows a relatively thick flexible membrane 40, e.g. made of elastomer, having a shape that corresponds to the shape of the lobed structure that is to be made. The way the keys 30 and the membrane 40 are used is described in detail below.

With reference to FIGS. 6 to 12, there follows a description of how a fiber preform for a lobed structure 10 is obtained in a first embodiment of the invention.

A strip 101 of fiber texture is made and cuts or incisions 102 are formed through the entire thickness of the strip from one of the longitudinal side edges 101a thereof in a direction that is substantially perpendicular to the edge 101a. The incisions 102 are of the same length and they extend over a fraction only of the width of the strip 101 so as to leave a non-incised zone 110 along the edge 101b that is opposite from the edge 101a. The pitch p of the incisions corresponds to the circumferential pitch of the locations where the lobes of the lobed-structure preform to be made start, i.e. corresponds to the pitch between the start locations 13b (FIG. 1) of the lobes 13 of the lobed structure to be fabricated.

Figure 7:
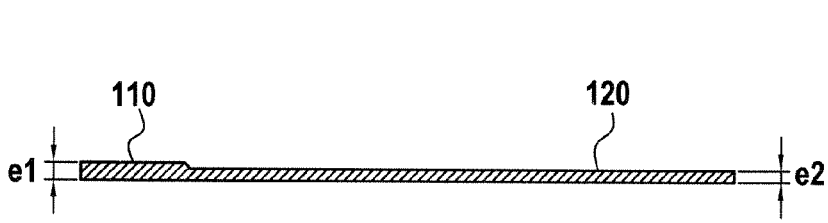
FIGS. 7 and 8 are section views on planes VII-VII and VIII-VIII of FIG. 6.

The zone 110 of the strip 101 is to form a first portion of the lobed-structure preform that corresponds to the annular portion 11 and that extends substantially as far as the connection with the lobes 13. As shown in FIG. 7, the zone 110 may be given a thickness e1 over at least a fraction of its width from the edge 101b that is greater than the thickness e2 of the remainder 120 of the strip 101 so as to obtain a greater thickness in the ring 2 whereby the mixer is mounted.

Figure 8:
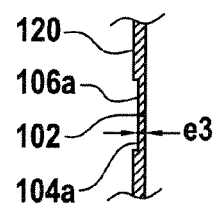

As shown in FIG. 8, in the zone 120 of the strip 101 that is to form a second portion of the lobed-structure preform corresponding to the multilobed skirt 12, it is possible to have a thickness e3 that is smaller than the thickness e2 in margin zones 104a and 106a along the edges of the incisions 102. Assembly with other component elements of the lobed-structure fiber preform can then take place with overlap in the margin zones 104a and 106a without giving rise to significant extra thicknesses, as described in greater detail below.

Figure 9:
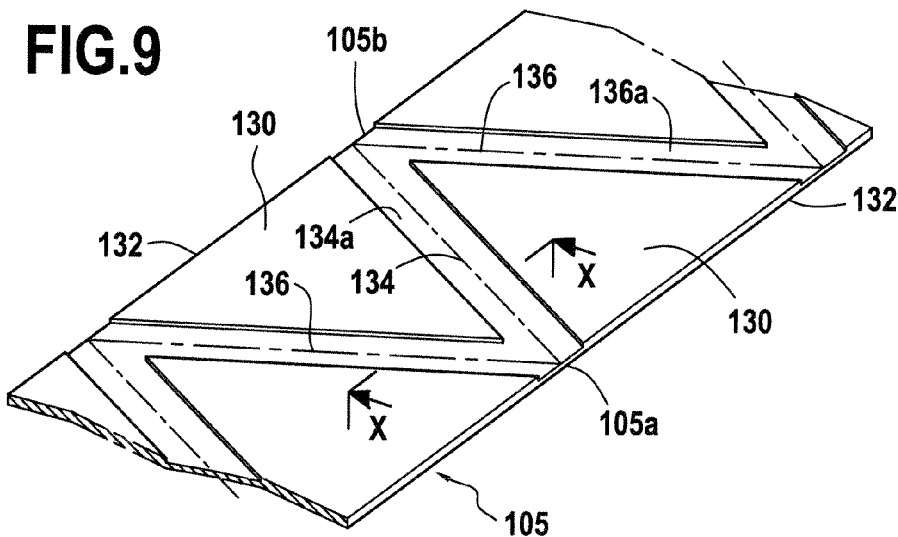
FIG. 9 is a fragmentary view showing a fiber texture from which sector-shaped elements can be cut out to form component elements of a fiber preform for a lobed structure in the first embodiment of the invention.

The other component elements of the lobed-structure fiber preform, associated with the strip 101, are sector-shaped element 130 that may advantageously be obtained by being cut out from a strip of fiber texture such as the strip 105 shown in FIG. 9.

Figure 10:
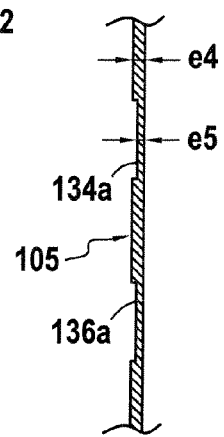
FIG. 10 is a fragmentary section view on plane X-X of FIG. 9.

In FIG. 9, the chain-dotted lines show the lines along which the elements 130 are cut out. The elements 130 are generally substantially triangular in shape, each having a base 132 and two edges 134 and 136, the bases 132 of the elements 130 extending in alternation along a side 105a of the strip 105 and along the opposite side 105b. As can be seen in FIG. 10, the strip 105 presents thickness e4 that is substantially equal to the thickness e2 of the zone 120 of the strip 101, with the exception of margin zones 134a and 136a of smaller thickness e5 along the edges 134 and 136 of the elements 130. The width of the margin zones 134a and 136a is substantially equal to the width of the margin zones 104a and 106a.

Figure 11:
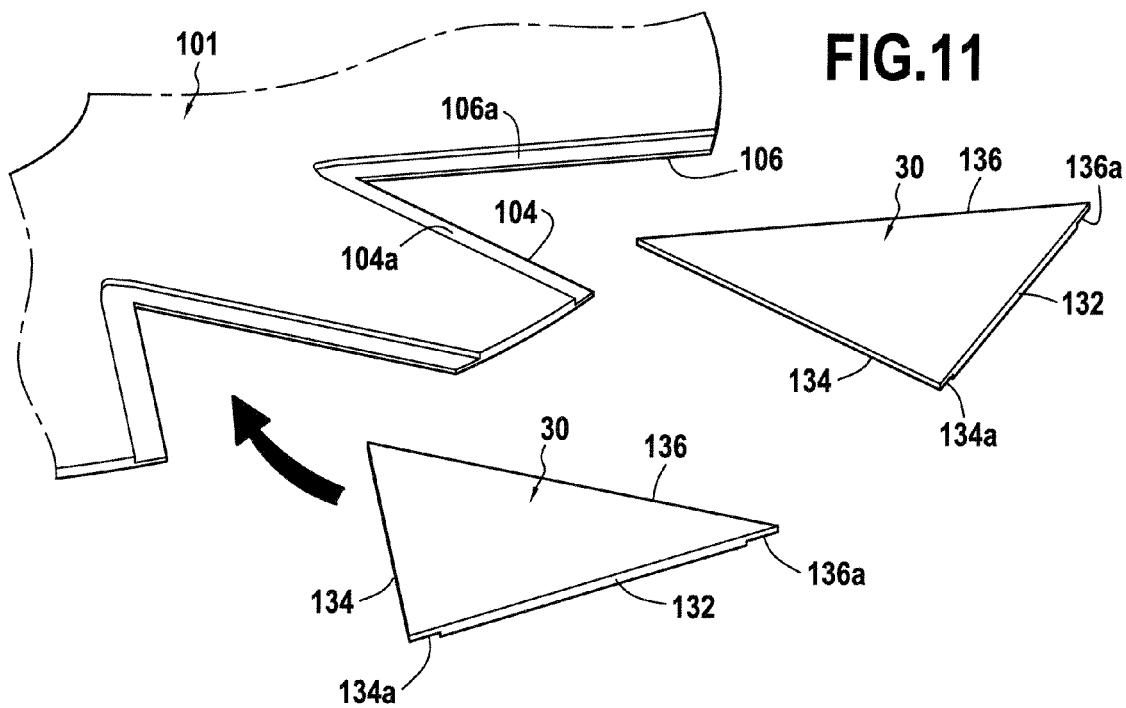
FIG. 11 is a fragmentary diagrammatic view showing the strip-shaped element of FIG. 5 being assembled with the sector-shaped element cut out from the fiber texture of FIG. 8, in the first embodiment of the invention.

The sector-forming elements 130 are assembled with the strip 101 by opening up the incisions 102 by splaying apart their edges 104 and 106 in order to insert the elements 130 cut out from the strip 105, as shown in FIG. 11. The margin zones 104a and 134a then overlap mutually, as to the margin zones 106a and 136a. The width of the strip 105 is selected so that the elements 130 occupy the space between the edges 104 and 106 of the incisions 102 over the entire length of said edges, and as many elements 130 are used as there are incisions 102, each element 130 being inserted between the edges of a respective incision.

Figure 12:
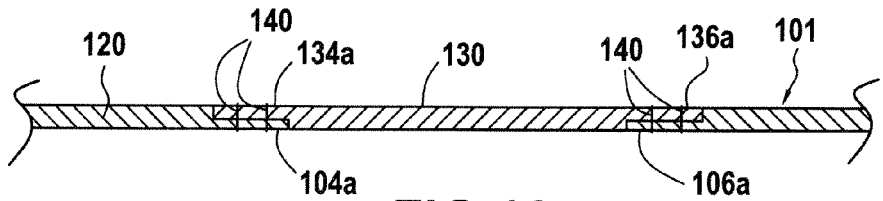
FIG. 12 is a detail view in section at a larger scale showing assembly with overlap between adjacent edges of a sector-shaped element and an incision of the strip-shaped element in the first embodiment of the invention.

FIG. 12 shows the overlap of the margin zones 104a & 106a with margin zones 134a & 136a, respectively. The thicknesses e3 and e5 are selected, e.g. equal to each other, in such a manner together their sum is substantially equal to the thicknesses e2 and e4, so as to avoid generating significant extra thicknesses. The connections between the elements 130 and the strip 101 are advantageously made by stitching in their superposed margin zones, using a stitching yarn 140. The stitching may be performed using a lockstitch or a chain stitch. Other methods of connection could be envisaged, such as implanting yarns as described for example in document U.S. Pat. No. 4,628,847, or by implanting needles or pins, as described in document WO 97/06948, or by adhesive, the connection being finished off by co-densifying the component elements of the fiber preform after they have been assembled together.

The strips 101 and 105 are advantageously made by three-dimensional weaving of the interlock type with varying thickness.

As mentioned above, the fiber preform is preferably made of ceramic fibers, in particular of SiC fibers. Weaving can then be performed using a yarn sold by the Japanese supplier Ube Industries Ltd. under the name "Tyranno ZMI" or a yarn sold by the Japanese supplier Nippon Carbon under the name "Nicalon". In order to facilitate weaving and avoid damaging the yarn during weaving, it is possible to cover the yarn in a material that can be eliminated subsequently without affecting the SiC yarn, for example it may be covered by a yarn made of polyvinyl alcohol (PVA) that can be eliminated by being dissolved in water.

Figure 13:
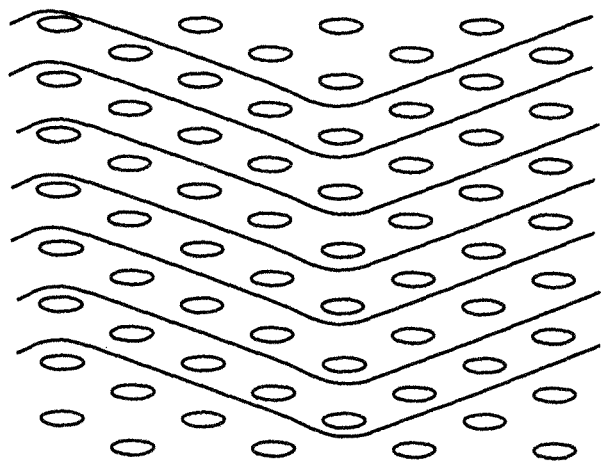
FIGS. 13 to 15 show weaves for three-dimensionally weaving component elements of the fiber preform for the lobed structure.
Figure 14:
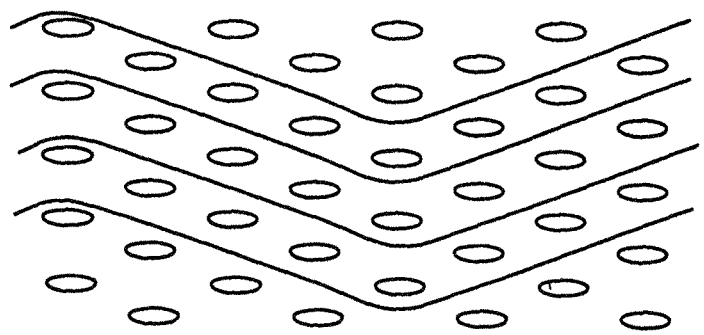
Figure 15:
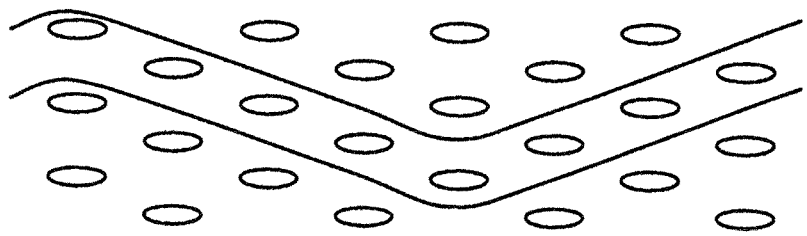

FIGS. 13 to 15 show the basic weaves used with such a yarn respectively for obtaining fabric having thickness e1=3 millimeters (mm) approximately, e2=e4=1.5 mm approximately, and e3=e5=0.75 mm approximately, the weft yarns being shown in section.

Three-dimensional weaving with an interlock type weave is weaving in which each warp yarn connects together a plurality of layers of weft yarns, the paths of the warp yarns being identical.

Changing from one thickness to another can be performed progressively by removing or adding layers of warp and weft yarns.

Other methods of three-dimensional weaving can be used, for example multilayer weaving with weaves of the multi-plain, multi-satin, or multi-serge types. Such weaves suitable for weaving fiber textures of varying thickness are described in particular in document PCT FR 2006/050617.

When the fibers of the fiber texture are made of ceramic, in particular of SiC, the stitching yarn 140 may also be made of SiC, for example it may be identical to that used for making the fiber texture. It is equally possible to use a stitching yarn made of carbon.

Figure 16:
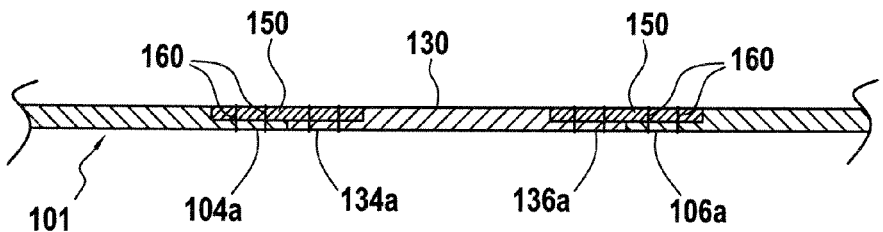
FIG. 16 is a detail view in section at a larger scale showing the assembly between adjacent edges of a sector-shaped element and an incision of a strip-shaped element, using an assembly strip in a variant of the first embodiment of the invention.

FIG. 16 shows a variant embodiment in which the elements 130 are assembled with the strip 101 by means of assembly strips 150 that cover the margin zones 104a & 134a and 106a & 136a, with the margin zones then being placed edge to edge and not being superposed. The strips 150 are cut out from a fiber texture, e.g. obtained by three-dimensional weaving, and of the same kind as the fiber texture of the strip 101 and of the elements 130. The thickness of the assembly strip is selected to avoid giving rise to significant extra thicknesses. The connection between the strip 101 and the elements 130 is made for example by stitching the assembly strips 150 onto the margin zones 104a & 134a and 106a & 136a by means of stitching yarn 160.

After the strip 101 has been assembled with the elements 130, the assembly is shaped on the former 20 to obtain the desired fiber preform for the lobed structure that is to be fabricated. The zone 110 of the strip 101 is applied onto the annular portion 21 and then the assembly formed by the zone 120 of the strip 101 and the sector-forming elements 130 is applied onto the multilobed portion 22 of the former 20 to obtain a fiber preform portion corresponding to the multi-lobed skirt 12 of the lobed structure. The fiber preform may be shaped with the help of shaping keys 30 (FIG. 4) and/or with the help of the membrane 40 (FIG. 5).

Figure 17:
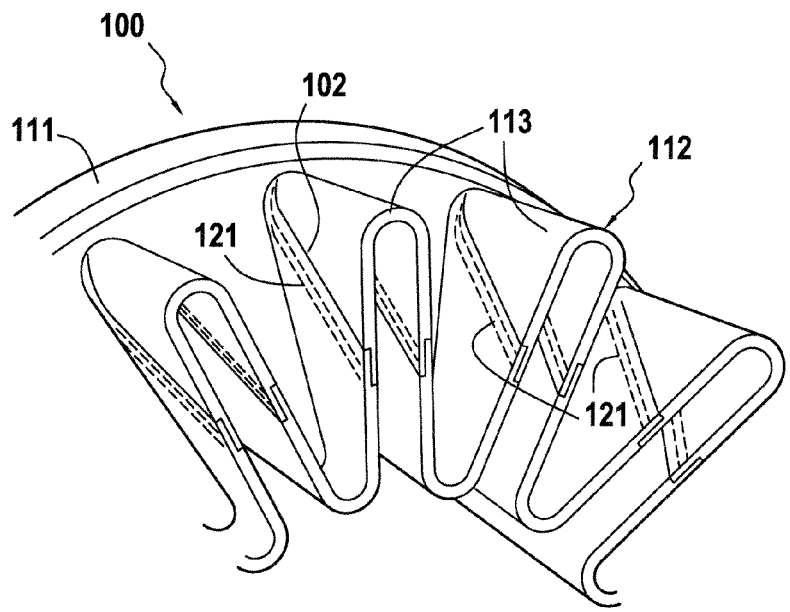
FIG. 17 is a fragmentary diagrammatic view in perspective showing a fiber preform for a lobed structure made up of an assembly of component elements in accordance with the first embodiment of the invention being applied with shaping onto a tooling element of FIG. 3.

FIG. 17 shows a portion of the lobed-structure fiber preform 100 as obtained in this way. The preform 100 has an annular preform portion 111 corresponding to the annular portion 11 of the lobed structure and formed by shaping the zone 110 of the strip 101 on the annular portion 21 of the former 20, and a multilobed preform portion 112 corresponding to the multilobed skirt 12 of the lobed structure and formed by shaping on the portion 22 of the former 20.

In the example shown in FIG. 17, the fiber preform 100 has been placed on the former 20 in such a manner that the connection lines 121 between the component elements of the preform (i.e. the margin zones stitched along the edges of the incisions formed in the strip 21) extend along the flanks of the lobes 113 of the preform portion 122. Such a disposition presents an advantage since, in the mixer that is produced by assembling the lobed structures obtained after the preforms 100 have been densified, these connection lines are located in zones of the mixer that are the least stressed mechanically.

In a variant, the connection lines between the component elements of the preform could be disposed along the outer crests of the lobes 113. Such a configuration also presents an advantage, since in the mixer as finally obtained, the connection lines are then located in zones of the mixer that are exposed to the lowest temperatures.

Either way, the connection lines extend substantially in the flow direction of the gas stream passing through the finally-obtained mixer so that any surface irregularities induced by the presence of the connection lines do not significantly disturb the flow of the gas stream.

The dimensions of the strip 101 and of the sector-forming elements 130 are naturally selected so as to obtain a preform 100 of shape that corresponds to the shape of the lobed structure to be fabricated, possibly taking account of optional final machining performed after the preform has been densified. Thus, the length of the strip 101 is selected as a function of the circumference desired for the preform portion 111, while the width of the strip 101 is selected as a function of the dimension desired for the preform 100 in the axial direction after the lobes 113 have been formed. In addition, the lengths of the bases 132 of the sector-forming elements 130 are selected to add to the length of the strip 101 so as to obtain a total length that corresponds to the developed length of the curve formed by the downstream end edge of the preform portion 112.

Figure 18:
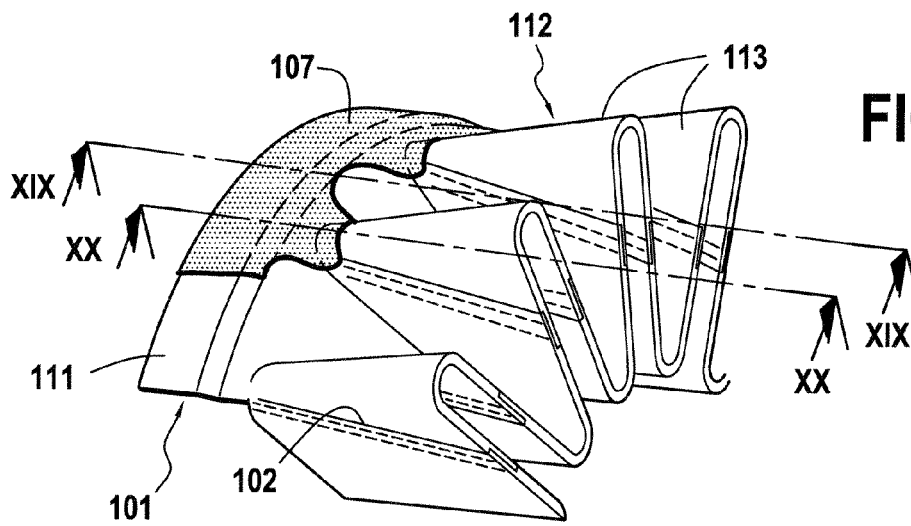
FIG. 18 is a fragmentary diagrammatic view in perspective showing the use of an additional annular ply of fiber texture for the portion of the preform corresponding to the annular portion of the lobed structure.

FIG. 18 shows a variant embodiment in which the strip 101 presents thickness in the preform portion 111 that is equal to the thickness of the preform portion 112 (apart from the margin zones beside the incisions 102 that are of smaller thickness).

Figure 19:
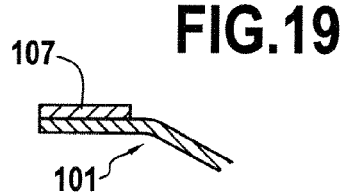
FIGS. 19 and 20 are fragmentary section views on planes XIX-XIX and XX-XX of FIG. 18.
Figure 20:
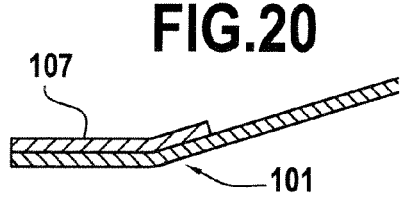

The extra thickness of the preform portion corresponding to the annular portion of the lobed structure can then be provided by adding an additional fiber ply 107, e.g. of the same kind as the strip 101. As shown in FIGS. 19 and 20, the ply 107 is of width that varies between a first value corresponding substantially to the width of the zone 110, and a second zone of greater width than the first in register with the incisions 102 so as to cover and reinforce the starter zones of the lobes 113 that are situated at the incisions 102.

The additional fiber ply 107 may be connected to the strip 101 in the same manner as the elements 130, e.g. by a few stitches, by implanting needles or pins, or indeed by adhesive.

A second embodiment of the invention is described below with reference to FIGS. 21 to 26.

In this second embodiment, the lobed-structure fiber preform is made by assembling and shaping a plurality of component elements, each comprising a sector of at least one ply constituting a first preform portion corresponding to the annular portion of the lobed structure and a sector of a second preform portion corresponding to the multilobed skirt of the lobed structure.

FIG. 21 is a diagram of such a component element 201 made as a single piece of fiber texture having two sector-forming portions 210 and 220, the portion 220 extending over an angle β that is greater than the angle α over which the portion 210 extends.

The element 201 presents constant thickness e6 with the exception of margin zones 204a and 206a that are of smaller thickness e7 along its longitudinal edges 204 and 206, as can be seen in FIG. 22.

Figure 23:
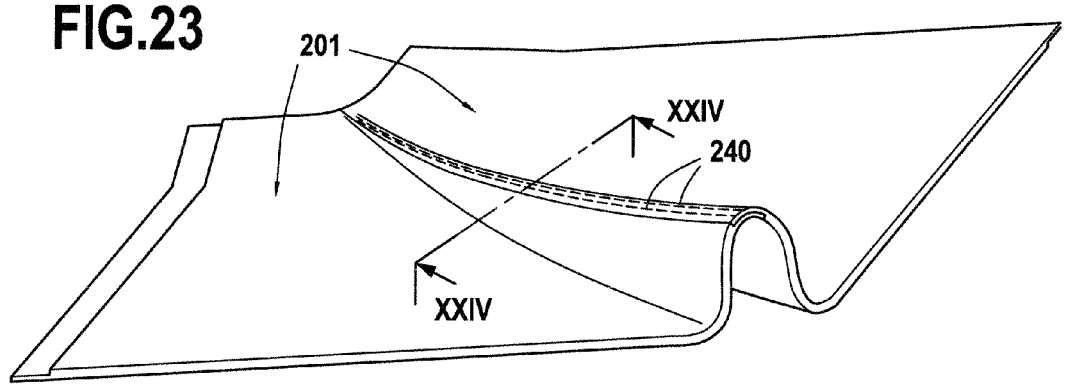
FIG. 23 is a fragmentary diagrammatic view showing how sector-forming elements of the kind shown in FIG. 21 are assembled together in the second embodiment of the invention.
Figure 24:
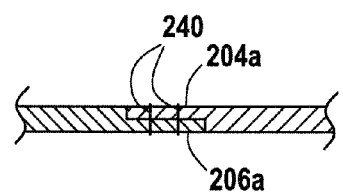
FIG. 24 is a detail view in section at a larger scale showing the assembly with overlap between adjacent edges of sector-forming elements in the second embodiment of the invention.

A plurality of sector-shaped elements 201 are assembled together with mutual overlap of the margin zones extending along their adjacent edges, as shown diagrammatically in FIGS. 23 and 24. The assembled-together elements 201 are connected to one another, e.g. by stitching, along the mutually overlapping margin zones, by using a stitching yarn 240 that is optionally of the same kind as the fiber texture constituting the elements 201. Other assembly techniques, in particular implanting needles or pins or using adhesive could also be used. The thickness e7 may be selected to be substantially equal to half the thickness e6 so as to avoid giving rise to significant extra thickness when the margin zones 204a and 206a overlap mutually.

A fiber assembly is then obtained having the general shape of a sector of a ring with an annular portion formed by uniting the ring sector-forming portions 210 and with a pleated portion (not capable of being developed) formed by uniting the sectors 220.

The elements 201 constituting the fiber preform can be made by three-dimensional weaving, e.g. of the interlock type, using thinner margin zones in the manner described above for the first embodiment of the invention. To make the elements 201, it is possible to use yarns of the same kind as those mentioned above, likewise for the first embodiment.

Figure 25:
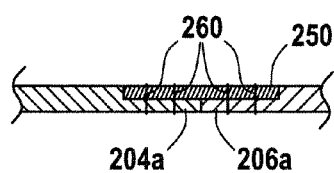
FIG. 25 is a detail view in section at a larger scale showing the assembly between adjacent edges of sector-shaped elements using an assembly strip, in a variant of the second embodiment of the invention.

FIG. 25 shows a variant embodiment in which the elements 201 are assembled together by means of assembly strips 250 that overlap the margin zones 204a and 206a that are no longer placed to overlap one another, but rather edge to edge. The strips 250 are cut out from a fiber texture obtained for example by three-dimensional weaving and of the same kind as the fiber texture of the elements 201. The thickness of the assembly strips 250 can be selected to avoid giving rise to any significant extra thickness. The connection between the elements 201 and the assembly strips 250 is made for example by stitching the assembly strips 250 onto the margin zones 204a and 206a by means of stitching yarns 260. It would also be possible to make the connection by implanting needles or pins, or by using adhesive.

After the elements 201 have been assembled and connected together, the assembly is shaped on the former 20 to obtain the desired preform for the lobed structure that is to be fabricated. The sector-shaped assembled portions 210 are applied to the annular portion 21 of the former 20 to obtain a ply constituting the preform portion 211 corresponding to the annular portion of the lobed structure. The sector-shaped assembled portions 220 are applied onto the multilobed portion 22 of the former 20, possibly with help from shaper keys 30 or the membrane 40 to obtain a multilobed preform portion 212 corresponding to the multilobed skirt of the lobed structure to be fabricated.

Figure 26:
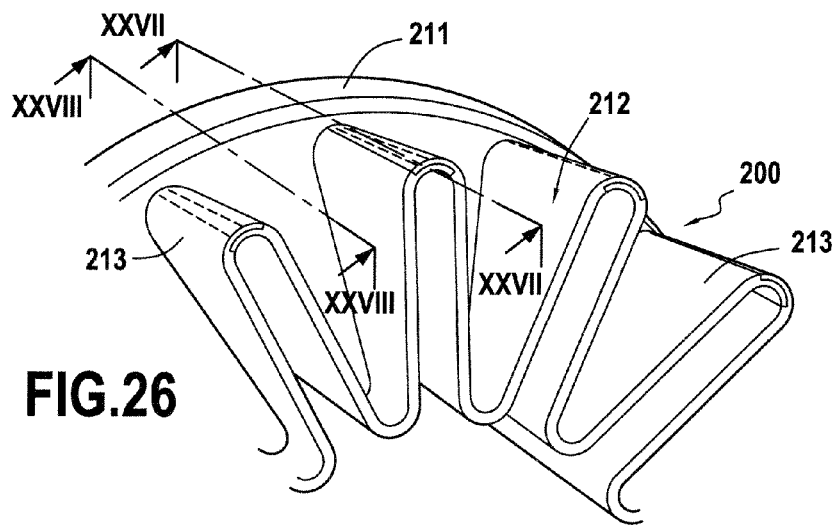
FIG. 26 is a fragmentary diagrammatic view in perspective showing a fiber preform for a lobed structure formed by assembling together component elements of the second embodiment of the invention being applied with shaping against a tooling element of FIG. 4.
Figure 28:
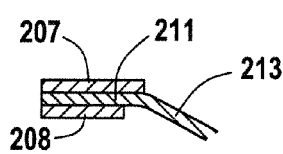
FIGS. 27 and 28 are fragmentary section views on planes XXVII-XXVII and XXVIII-XXVIII of FIG. 26 showing, in particular, additional fiber plies used for the portion of the preform corresponding to the annular portion of the lobed structure.
Figure 27:
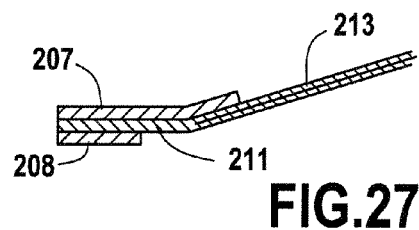

FIG. 26 shows a portion of the lobed-structure preform 200 obtained in this way. The thickness of the preform portion 211 may be reinforced by adding an additional fiber ply 207, e.g. of the same kind as the elements 201. As shown in FIGS. 26 to 28, the ply 207 is of width that varies between a first value corresponding substantially to the width of the preform portion 210, and a larger second value so that it extends as far as the starter zones of the lobes 213 of the preform 200, in order to reinforce these zones. Another additional ply 208 similar to the ply 207 but capable of having constant width corresponding to the width of the portion 210 may be placed on the other side of the preform portions 211, the ply 208 being disposed on the annular portion 21 of the former 20 before applying the assembly of the assembled-together elements 201. The plies 207 and 208 may be connected to the sector-forming portion 210, e.g. by stitching, implanting needles or pins, or using adhesive.

It should be observed that the elements 201 can be made with greater thickness in the sectors 210 so as to obtain directly an annular preform portion 211 that is of greater thickness, without it being necessary to add additional plies.

The fiber preform 200 is placed on the former 20 while it is being shaped in such a manner that the assembly lines between the sector-forming portions 220 are preferably situated along the flanks of the lobes or along the outer crests of the lobes (as shown in FIG. 26), for the reasons mentioned above concerning the preform 100.

The dimensions of the elements 201 are selected to obtain a lobed-structure preform of shape 200 corresponding to the shape of the lobed structure to be fabricated, possibly taking account of optional final machining after densification of the preform. In particular, the sector-shaped portions 220 need to extend over an angle β that is large enough to enable the desired lobes 213 to be formed.

In the above, it is envisaged that the margin zones of the component elements of the fiber preform that overlap one another or that overlap assembly strips for the purpose of assembling the preform are given smaller thickness. Nevertheless, that is not essential, and the thickness of the overlapping margin zones need not be smaller, providing the extra thickness that then arises during assembly of the component elements of the preform does not significantly affect the aerodynamic behavior of the mixer as finally obtained.

The fiber preform 100 or 200 may be obtained from dry fiber texture elements (i.e. not impregnated) or from pre-impregnated fiber texture elements.

When the texture is not pre-impregnated, and prior to densifying the preform with a matrix that is at least partially made of ceramic, a prior step may be performed of consolidating the fiber preform by partial densification with a consolidation matrix. This consolidation step may consist in impregnating the fiber preform with a ceramic- or carbon-precursor liquid composition, e.g. a resin optionally dissolved in a solvent, and then in transforming the precursor by heat treatment, after eliminating the solvent, if any, and after curing the resin. By way of example, SiC precursors are resins of the polycarbonsilane, polytitanocarbosilane, polysilazane, or polysiloxane types, while a precursor for carbon is for example a resin having a relatively high coke content such as phenolic resin. Methods of consolidating fiber preforms are described in particular in documents WO 2006/090087, FR 06/54542, and U.S. Pat. No. 5,846,379, including, where appropriate, forming an interphase coating between the fibers and the matrix. Such an interphase coating, e.g. of pyrolytic carbon or of boron nitride (BN) may also be formed beforehand on the fiber texture used for making the component elements of the preform, or it can be formed after the elements have been assembled together. Forming the interphase coating can then be formed by chemical vapor infiltration.

For consolidation purposes, the dry fiber preform 100 or 200 is shaped on the former 20 constituting a male mold, e.g. by means of shaper keys 30 constituting female mold elements. The shaper keys are withdrawn and the membrane 40 is put into place. The fiber preform is impregnated with the liquid precursor for the consolidation matrix. Impregnation of the preform may be assisted by evacuating the space between the former 20 and the membrane 40, the membrane then possibly being covered by a leakproof film.

After the resin has dried and cured, heat treatment is performed to transform the precursor resin by pyrolysis into ceramic or carbon, thereby obtaining a consolidated fiber preform that has been partially densified by a ceramic or carbon matrix. The consolidated preform is "frozen" in the desired shape as defined by the former 20 and the membrane 40. The use of a membrane 40 made of elastomer contributes to giving a relatively smooth appearance, attenuating irregularities such as those that result from the connections made between the component elements of the preform.

When using a pre-impregnated fiber texture, pre-impregnation may be performed by a ceramic- or carbon-precursor resin of the kind mentioned above, the resin possibly being pre-polymerized after eliminating a solvent used for impregnation purposes, if any.

The fiber preform obtained by assembling elements of pre-impregnated fiber texture is shaped on the former 20, e.g. by means of the membrane 40. The molding of the preform may be assisted by applying a pressure difference and the resin is subsequently fully cured.

Transformation of heat treatment by pyrolyzing the precursor resin into ceramic or carbon is then performed and a consolidated fiber preform is then obtained that is partially densified by a ceramic or carbon matrix.

Either way, the densification of the consolidated preform is continued by forming a ceramic matrix, e.g. by chemical vapor infiltration (CVI).

The ceramic matrix may be a refractory ceramic, such as SiC, or advantageously it may be a "self-healing" ceramic matrix. A "self-healing" ceramic matrix is obtained by making at least one component phase of the matrix out of a material that is capable, on passing to a viscous state within a certain temperature range, of filling in or "healing" cracks that form in the matrix, in particular under the effect of thermal cycling. Compositions having "self-healing" properties are in particular vitreous compositions, e.g. of the aluminosilicate type, or compositions that are capable, under the effect of oxidation, of forming vitreous compositions. Matrix phases made of boron carbide $B_4C$ or of a ternary Si—B—C system constitute precursors for vitreous compositions.

Figure 29:
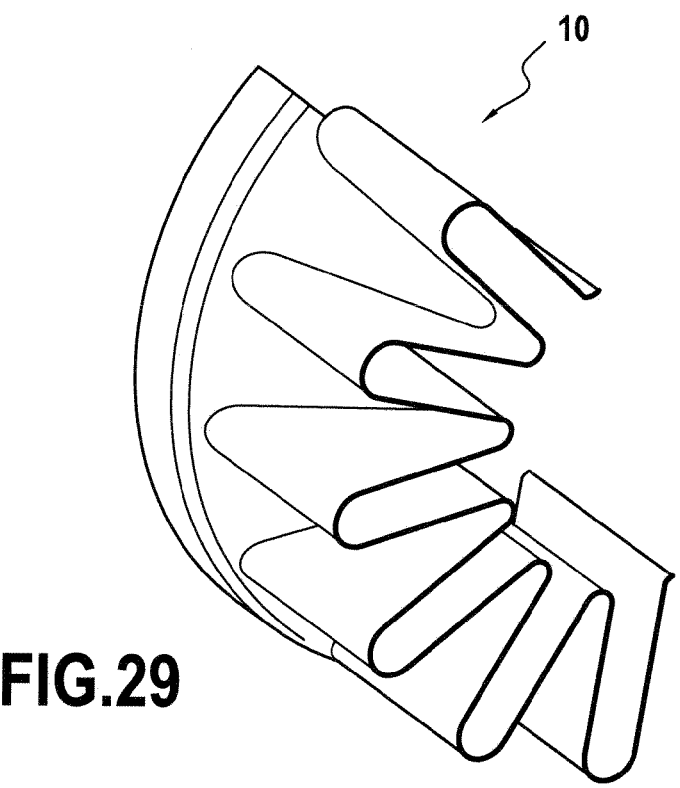
FIG. 29 is a diagrammatic perspective view of a lobed structure as obtained in the first or second embodiment of the invention.

After densification with the ceramic matrix, a CMC lobed structure is obtained such as the structure 10 shown in FIG. 29, forming a sector of a lobed mixer.

With a dry fiber preform, it should be observed that consolidation of the preform can be obtained by using CVI rather than a liquid technique (impregnation by a liquid precursors for the consolidation matrix followed by curing and then pyrolysis). Under such circumstances, rigid tooling elements are used for the former 20 and the shaper keys 30 suitable both for keeping the fiber preform in the desired shape and also advantageously multiply-perforated so as to encourage access for the vapor phase to the preform.

In the example described, the mixer is obtained by assembling three sectors together. Naturally, the number of sectors making up the mixer and each constituting a lobed structure could be other than three, with the tooling used for making the preforms being adapted to the shapes of the lobed structures that are to be made.

Figure 30:
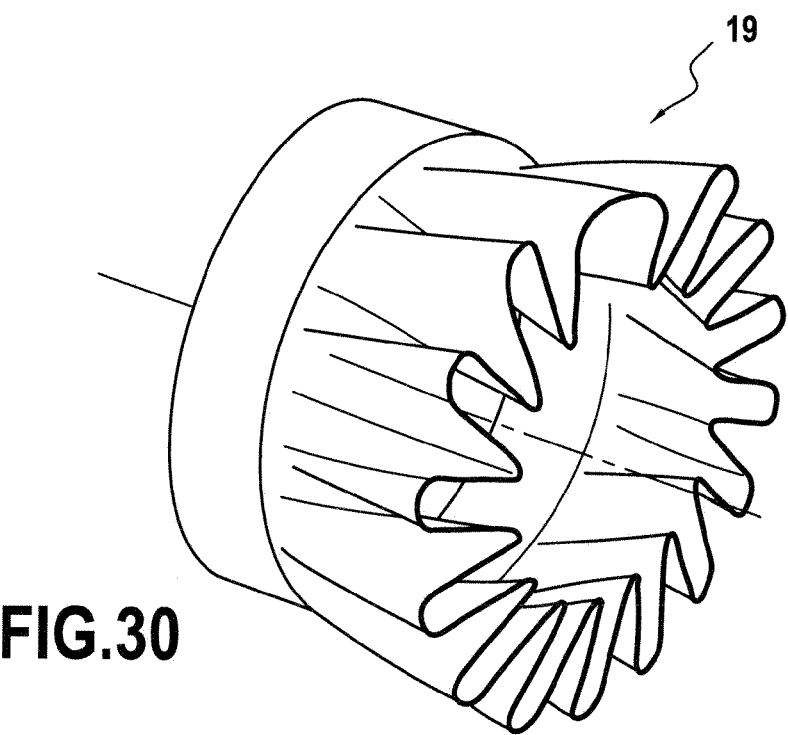
FIG. 30 is a diagrammatic perspective view of a lobed structure as obtained in yet another embodiment of the invention.

It is also possible to make a mixer 19 out of CMC as a single part by densifying a complete fiber preform for a mixer. Such a mixer is shown in FIG. 30. For shaping the fiber preform, use is then made of a former and a membrane having shapes that correspond to the shape of the complete mixer that is to be obtained. In the embodiment of FIGS. 6 to 12, the two ends of the zone 120 of the fiber texture strip 101 are then treated as edges of an incision and the two ends of the zone 110 of the fiber texture strip 101 are assembled together via their margin zones, in the same manner as the component elements of the preform are assembled together, thereby forming a complete ring.

Thus, in the description and the claims, the term "lobed structure" should be understood as designating a complete lobed mixer, or merely a sector of such a mixer.

The invention claimed is:

1. A method of fabricating a lobed structure for a gas turbine flow mixer having a shape defined by an annular upstream portion extended downstream by a portion forming a multilobed skirt having a plurality of lobes distributed around a longitudinal axis of the lobed structure, the method comprising:
    making a plurality of elements of a flexible woven fiber texture formed of refractory fibers;
    making a fiber preform and having a shape corresponding to the shape of the lobed structure to be fabricated, by assembling together said plurality of elements of the flexible woven fiber texture and by shaping the assembled elements of the flexible woven fiber texture with deformation by means of tooling of a shape corresponding to the shape of the lobed structure to be fabricated so as to obtain said fiber preform having a first preform portion corresponding to the annular portion of the lobed structure and a second preform portion corresponding to the multilobed skirt of the lobed structure, said plurality of elements of the flexible woven fiber texture being assembled together at least in part along connection lines extending substantially in the flow direction of the flow past the lobes of the second preform portion of the multilobed skirt; and
    subsequently densifying the shaped fiber preform by means of a matrix comprising a ceramic material.

2. The method according to claim 1, wherein the plurality of elements of the flexible woven fiber texture are assembled together by stitching.

3. The method according to claim 1, characterized in that the plurality of elements of the flexible woven fiber texture are assembled together by implanting yarns, needles, or pins.

4. The method according to claim 1, wherein the plurality of elements of the flexible woven fiber texture are assembled together along connection lines that extend along flanks of the lobes of the second preform portion corresponding to the multilobed skirt.

5. The method according to claim 1, wherein the plurality of elements of the flexible woven fiber texture are assembled together along connection lines extending along outer crests of the lobes of the second preform portion corresponding to the multilobed skirt.

6. The method according to claim 1, wherein the plurality of elements of the flexible woven fiber texture are assembled together with adjacent edges thereof overlapping.

7. The method according to claim 1, wherein the plurality of elements of the flexible woven fiber texture are assembled together by means of assembly strips overlapping adjacent edges thereof.

8. The method according to claim 1, wherein the plurality of elements of the flexible woven fiber texture are made with reduced thickness in overlapped zones of adjacent edges.

9. The method according to claim 1, wherein the plurality of elements of the flexible woven fiber texture are made by three-dimensional weaving.

10. The method according to claim 1, wherein the plurality of elements of the flexible woven fiber texture are made of ceramic fibers.

11. The method according to claim 1, wherein the plurality of elements of the flexible woven fiber texture are made of silicon carbide fibers.

12. A method of fabricating a lobed structure for a gas turbine flow mixer having a shape defined by an annular upstream portion extended downstream by a portion forming a multilobed skirt having a plurality of lobes distributed around a longitudinal axis of the lobed structure, the method comprising:
making a first element in the form of a strip of a flexible woven fiber texture formed of refractory fibers;
making incisions through the strip, the incisions extending from one side of the strip, substantially perpendicularly to said side and over a distance that is less than the width of the strip, the incision having opposite edges;
cutting out sector-shaped second elements from a flexible woven fiber texture formed of refractory fibers, the sector-shaped second elements having edges forming an angle;
making a fiber preform having a shape corresponding to the shape of the lobed structure to be fabricated, by assembling together said first and second elements of the flexible woven fiber texture and by shaping the assembled first and second elements of the flexible woven fiber texture with deformation by means of tooling of a shape corresponding to the shape of the lobed structure to be fabricated so as to obtain said fiber preform having a first preform portion corresponding to the annular portion of the lobed structure and a second preform portion corresponding to the multilobed skirt of the lobed structure, said first and second elements of the flexible woven fiber texture being assembled together by inserting each sector-shaped second element between the opposite edges of a corresponding incision of the first element and by connecting together the edges of each inserted sector and the edges of the corresponding incision along connection lines extending substantially in the flow direction of the flow past the lobes of the second preform portion of the multilobed skirt; and
subsequently densifying the shaped fiber preform by means of a matrix comprising a ceramic material.

13. The method according to claim 12, wherein the first element is made by three-dimensional weaving with a thickness in margin zones along the edges of the incisions that is less than a thickness in a remaining portion of the first element.

14. The method according to claim 12, wherein the first preform portion corresponding to the annular portion of the lobed structure is obtained by superposing at least one additional annular ply of fiber texture on the first element.

15. The method according to claim 14, wherein an additional annular ply covers starter zones of the lobes of the second preform portion corresponding to the multilobed skirt of the lobed structure at the ends of the incisions formed in the first element.

16. The method according to claim 12, wherein the first and second elements of the flexible woven fiber texture are assembled together by stitching.

17. The method according to claim 12, characterized in that the first and second elements of the flexible woven fiber texture are assembled together by implanting yarns, needles, or pins.

18. The method according to claim 12, wherein the first and second elements of the flexible woven fiber texture are assembled together with adjacent edges thereof overlapping.

19. The method according to claim 12, wherein the first and second elements of the flexible woven fiber texture are assembled together by means of assembly strips overlapping adjacent edges thereof.

20. The method according to claim 12, wherein the first and second elements of the flexible woven fiber texture are made with reduced thickness in overlapped zones of adjacent edges.

21. The method according to claim 12, wherein the first and second elements of the flexible woven fiber texture are made by three-dimensional weaving.

22. The method according to claim 12, wherein the first and second elements of the flexible woven fiber texture are made of ceramic fibers.

23. The method according to claim 12, wherein the first and second elements of the flexible woven fiber texture are made of silicon carbide fibers.

24. A method of fabricating a lobed structure for a gas turbine flow mixer having a shape defined by an annular upstream portion extended downstream by a portion forming a multilobed skirt having a plurality of lobes distributed around a longitudinal axis of the lobed structure, the method comprising:
making a plurality of elements of a flexible woven fiber texture formed of refractory fibers;
making a fiber preform having a shape corresponding to the shape of the lobed structure to be fabricated, by assembling together said elements of the flexible woven fiber structure and by shaping the assembled elements of the flexible woven fiber texture with deformation by means of tooling of a shape corresponding to the shape of the lobed structure to be fabricated so as to obtain said fiber preform having a first preform portion corresponding to the annular portion of the lobed structure and a second preform portion corresponding to the multilobed skirt of the lobed structure, each of said elements of the flexible woven fiber texture comprising a first sector forming one sector of a first annular ply constituting the first preform portion and a second sector forming one sector of the second preform portion, each second sector having opposite edges, and the elements of the flexible woven fiber texture being assembled together at least along adjacent ones of said edges of the second sectors; and
subsequently densifying the shaped fiber preform by means of a matrix comprising a ceramic material.

25. The method according to claim 24, wherein, in order to obtain the first preform portion corresponding to the annular portion of the lobed structure, at least one additional annular ply of fiber texture is added covering at least the first sectors forming the one sector of the first annular ply of each of said elements.

26. The method according to claim 25, wherein an additional and substantially annular ply covers starter zones of the lobes of the second preform portion corresponding to the multilobed skirt so as to reinforce the starter zones of the lobes.

27. The method according to claim 24, wherein the plurality of elements of the flexible woven fiber texture are assembled together by stitching.

28. The method according to claim 24, characterized in that the plurality of elements of the flexible woven fiber texture are assembled together by implanting yarns, needles, or pins.

29. The method according to claim 24, wherein the plurality of elements of the flexible woven fiber texture are assembled together with adjacent edges thereof overlapping.

30. The method according to claim 24, wherein the plurality of elements of the flexible woven fiber texture are assembled together by means of assembly strips overlapping adjacent edges thereof.

31. The method according to claim 24, wherein the plurality of elements of the flexible woven fiber texture are made with reduced thickness in overlapped zones of adjacent edges.

32. The method according to claim 24, wherein the plurality of elements of the flexible woven fiber texture are made by three-dimensional weaving.

33. The method according to claim 24, wherein the plurality of elements of the flexible woven fiber texture are made of ceramic fibers.

34. The method according to claim 24, wherein the plurality of elements of the flexible woven fiber texture are made of silicon carbide fibers.

* * * * *